United States Patent

[11] 3,602,129

[72] Inventor Vincent W. Cherre
  Rochester, N.Y.
[21] Appl. No. 828,602
[22] Filed May 28, 1969
[45] Patented Aug. 31, 1971
[73] Assignee Andex Corporation
  Rochester, N.Y.

[54] PERCOLATOR-CONTROLALATOR
  4 Claims, 9 Drawing Figs.
[52] U.S. Cl. .................................................. 99/282,
  99/312, 219/491
[51] Int. Cl. .................................................. A47j 31/00
[50] Field of Search ............................................ 99/281,
  282, 280, 312, 302–315; 219/491

[56] References Cited
  UNITED STATES PATENTS
1,437,005  11/1922  Newsom .......................... 99/282
2,552,169  5/1951  Graham .......................... 99/282
2,694,770  11/1954  Sullivan .......................... 99/281
2,720,154  10/1955  Graham .......................... 99/281 X
2,904,667  9/1959  Deist ............................ 99/281 X
3,387,554  6/1968  Cherre .......................... 99/312

Primary Examiner—William I. Price
Attorney—Kemon, Palmer & Estabrook

ABSTRACT: A coffeepot for extracting the desirable quantity of soluble solids from ground coffee at a temperature lower than the boiling point of water. The pot comprises a water-coffee container supporting a grounds-holding basket on a stem member and including a pressurizer chamber for receiving water from the stem member and discharging same at a temperature of 195 ± 5° F. into coffee grounds in the basket. The pot also includes a detachable heating unit where the heating unit comprises a spring-operated timing switch connected in series with a thermally operated switch and a resistance heater.

INVENTOR
VINCENT W. CHERRE

BY KENON, PALMER & ESTABROOK

ATTORNEYS

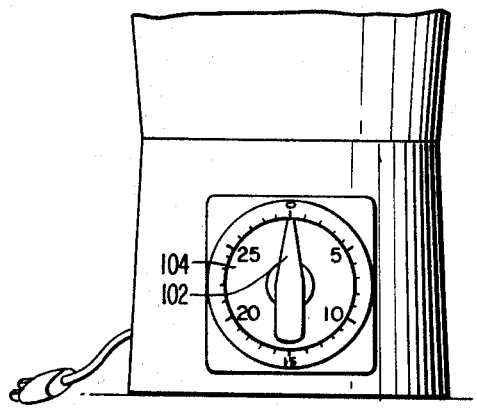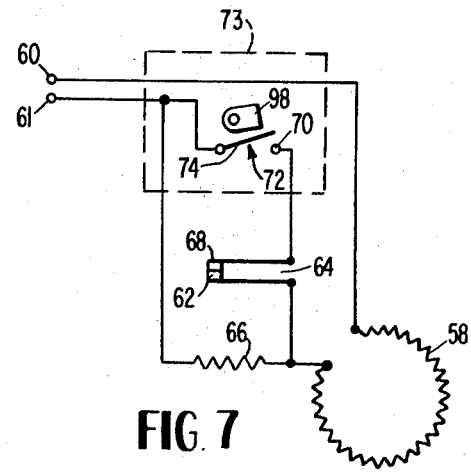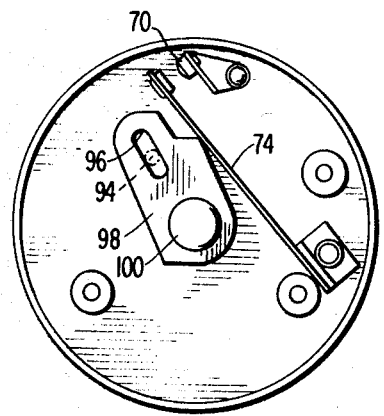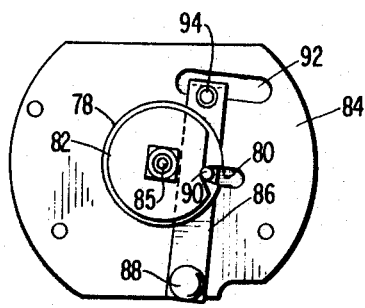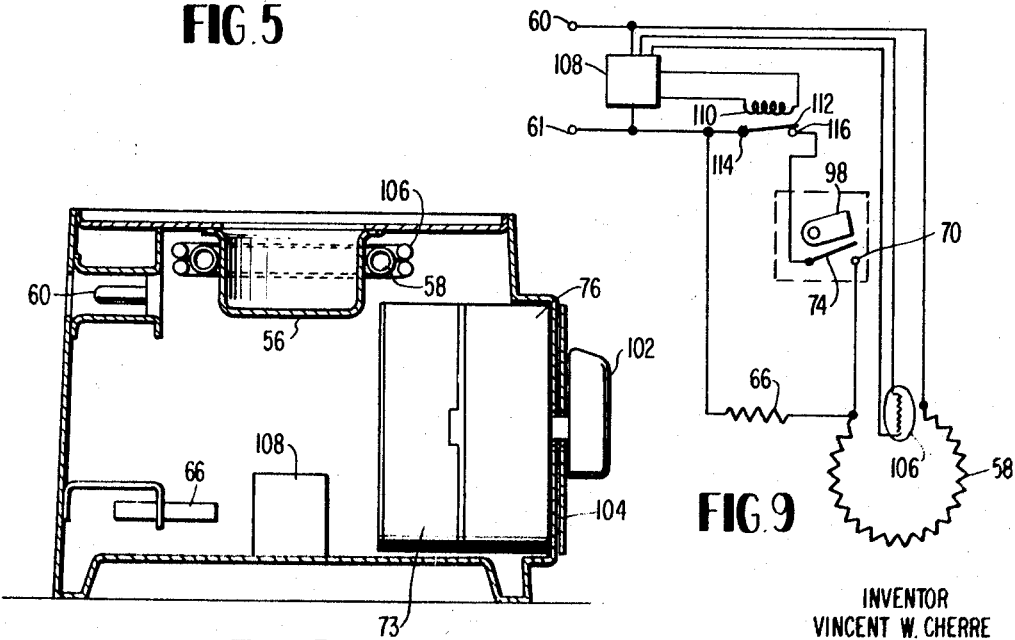

3,602,129

PERCOLATOR-CONTROLALATOR

FIELD OF THE INVENTION

The invention relates to automatic coffeemakers. In particular it relates to coffeemakers that utilize timing means in cooperation with thermal elements for the purpose of automatically brewing a pot of coffee.

THE PRIOR ART

The Coffee Brewing Institute, hereinafter C. B. I., has established standards for home coffee percolators regarding the extraction of soluble solids from coffee grounds for the purpose of obtaining a good brew of coffee, i.e., coffee that is neither underextracted (weak) or overextracted (strong and bitter). According to the standards and assuming one measure of grounds per cup of coffee, the most desirable brew may be achieved by extracting soluble solids from the coffee grounds with water at a temperature of 195±5° F. for a period of 6–8 minutes. If a coffee filter is employed the period should be extended to 8–10 minutes. The C. B. I. indicates that if the stated conditions are met 18–22 percent of soluble solids will be extracted.

For a variety of reasons, those automatic percolators that are presently known to be on the market are incapable of achieving the standards except by accident. Most such percolators are provided with thermostatic switches for controlling the brewing operation. For example, some models provide a setscrew or lever which the user may either turn or slide to preset the distance between the contacts of a bimetallic switch, e.g., see U.S. Pat. Nos. 2,798,143 and 3,144,547 assigned to the Westinghouse Corporation; U.S. Pat. No. 2,843,720 assigned to the General Electric Company, and U.S. Pat. No. 3,135,189 assigned to the Sunbeam Corporation.

In general, a bimetallic switch is a device that responds to a specific temperature. In the percolators mentioned next above, the bimetallic switch is used to deenergize a main heating element when a specific temperature is achieved. In U.S. Pat. No. 2,843,720, the main element is deenergized to stop percolation when water temperature reaches 190° F.

Such percolators are deficient for the reason that they are wholly temperature dependent. In operation, they percolate over a period of time with water at temperatures ranging from approximately the temperature of ta water up to and including water at the boiling point. Usually, the brewer is instructed by the vendor and/or manufacturer of such a percolator to always brew the coffee with a pot that is at least three-fourths full of water. This instruction is given for the reason that if a brewer attempts to brew a smaller quantity of coffee he (she) will obtain weak or underextracted coffee. A smaller quantity of water achieves the operating temperature of the bimetallic switch much faster than does a full pot, and consequently the period during which water percolates through the grounds is reduced such that a weak brew results.

Other prior art percolators have taught the use of timing means for controlling brewing time. One such percolator is taught by U.S. Pat. No. 2,402,163 to W. H. Huenergardt and another such percolator is taught by U.S. Pat. No. 2,723,335 to P. M. Hotchkin. Each of the percolators taught by these patents is deficient for the reason that they function solely on time. They thus ignore the requirement that the temperature of the water, as it percolates through the grounds, should be in the range 190–200° F. Indeed, the Huenergardt teaching is that the timer should not begin to operate until the water is boiling, i.e., until the water is at 212° F.

SUMMARY OF THE INVENTION

In order to achieve uniform results in the brewing of coffee a percolator should be both time and temperature dependent. It should be capable of passing water at a temperature of 195±5°F. through the grounds for whatever period the brewer desires. It should be recognized that the tastes of the brewer may differ such that the brewer may desire a period that is greater than or less than the C. B. I. standards.

Accordingly, it is the principal object of this invention to provide a new and novel automatic coffee percolator that functions both on a time and temperature basis and is capable of brewing coffee in accordance with the standards of the C. B. I.

It is an object of this invention to provide a new and useful automatic coffee percolator provided with a presettable timing means for establishing a brewing interval and with a thermostatic means for controlling water temperature during such interval.

It is an additional object of this invention to provide a new and useful automatic coffee percolator that automatically extracts soluble solids from coffee grounds at a water temperature of 195±5° F. while maintaining water temperature in the coffee pot at 165° F. for a predetermined interval of brewing time.

These and other objects of the invention will become apparent upon a reading of the hereinafter described embodiments of the invention taken with the drawings, in which:

FIG. 4 is a partial showing of the timer dial mechanism of the percolator of FIG. 1;

FIG. 5 is a view of the timer's electrical contacts;

FIG. 6 is a view of a cam operated lever of the timer for operating the electrical contacts;

FIG. 7 is a schematic of the percolator's heating control circuit;

FIG. 8 is a partial sectional view of a second embodiment of the percolator; and FIG. 9 is a schematic of the heating control circuit for the embodiment represented in FIG. 8.

DESCRIPTION OF AN EMBODIMENT

Figure 1:
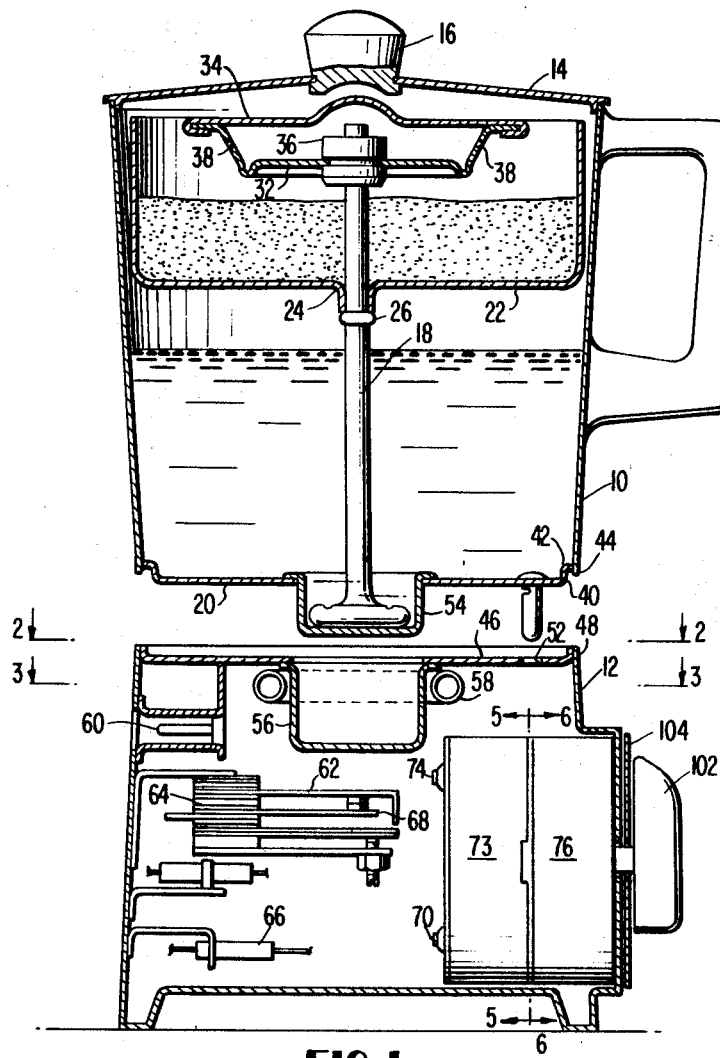
FIG. 1 is a sectional view of an automatic coffee percolator made in accordance with the present invention.
Figure 2:
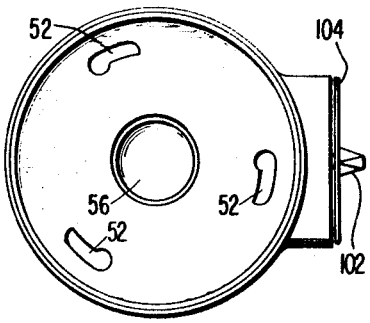
FIG. 2 is a plan view taken on the line 2—2 of FIG. 1.
Figure 3:
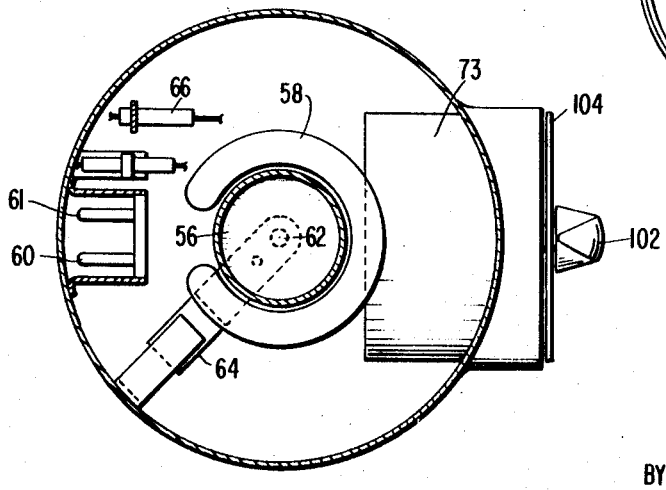
FIG. 3 is a plan view taken on the line 3—3 of FIG. 1.

Referring to the drawings, there is shown in FIG. 1 an automatic coffee percolator which includes a container or pot 10, having a conventional pouring spout (not shown) and handle and which includes a control or heating unit 12. The container is provided with a cover or lid 14 which has the usual glass knob 16 secured thereto, while a conventional hollow stem or tube member 18 is supported by a bottom wall 20 of the container. The wall 20 should be made out of a good thermally conductive material such as aluminum. The upper portion of the stem member 18 has mounted thereon a coffee grounds retaining basket 22, which basket is provided with a downwardly extending flange 24 abutting on an annular protuberance 26 on the stem member 18. The basket 22, preferably, is not of the thin, deep type used in some percolators presently on the market. In the preferred embodiment, the basket, for an 8–0 cup percolator, is approximately 2½ inches high and has a diameter of approximately 4⅝ inches.

A pressurizer unit 28 of the type taught by U.S. Pat. No. 3,387,554 and assigned to the assignee of this teaching is mounted on the upper end of the stem 18. The pressurizer unit is frictionally mounted on the stem by a resilient plug 30, and includes a bottom annular saucerlike member 32 and a top annular platelike member 34. The members 32 and 34 form between them a pressurizer chamber 36, and the upper end of the stem member 18 communicates with the chamber such that water pumped up the stem discharges into the chamber. The saucerlike member 32 is provided with a plurality of spaced water discharge ports 38 whereby water in the chamber 36 may be discharged into coffee grounds supported in the basket 22. The reader is referred to U.S. Pat. No. 3,387,554 for the details of construction of an embodiment of a pressurizer unit suitable for use with the present invention.

As shown in FIG. 1, the pot 10 is constructed in such a fashion as to be capable of mating to and locking with the control unit 12. To this end, the bottom wall 20 of the pot is provided, at its outer periphery, with an upwardly extending annular flange 40 and an annular and outwardly extending lip 42. A cylindrical portion 44 of the pot extends downwardly past the lip 42 to thus form an annular groove in the bottom of the pot.

The control unit 12 is provided with an annular and recessed top wall 46, where the wall is provided with an annular and upwardly extending flange at its outer periphery. The flange is joined by usual methods to the sidewall of the the unit 12 to thereby form a ring 48 that will mate in the groove formed in the pot. In addition, the bottom wall 20 of the pot supports a plurality of downwardly extending lugs 50 where the lugs mate with and lock in an equal number of locking cutouts 52 in the wall 46 of the control unit.

The separability of the pot and control unit is considered important in that it facilitates ease of cleaning (of the pot) while at the same time it extends the useful life of the appliance. Prior art unitary, automatic percolators of the so-called immersible type are usually provided with a gasket to form a watertight joint between the pot and the control unit. In practice, the gaskets deteriorate or shrink, thus allowing water to enter the control unit which in turn causes the control to become defective.

As shown in FIG. 1, the bottom wall 20 of the pot is shown formed to provide a water well 54. In turn, the top wall 46 of the control unit is shown with an annular recessed portion 56 for receiving the water well. When this type of arrangement is used, the stem member 18 is of the valve type. Obviously, the construction of the pot and control unit can be modified to accommodate either a splay-type stem member or a p post-type stem member. In the former case, the walls 20 and 46 would be substantially flat. In the latter case, the wall 46 would be provided with an upwardly extending post and the bottom wall 20 of the pot 10 with an annular recess.

Referring now to FIGS. 1 through 7, a resistance heater unit 58 is shown supported within the control unit adjacent the top wall 46. The heater may be enclosed within a sheathing and secured to the wall 46 in the usual manner. Electrically the heater may be connected directly to a terminal 60 of two electrical terminals 60, 61 shown recessed within, and supported by, the control unit. A conventional cord and plug may be used to connect the terminals 60, 61 to the usual electrical outlet. On its other side the heater is connected to a contact 62 of a snap action, bimetallic switch 64 and to a voltage dropping resistor 66; the resistor is connected on its other side to the terminal 61. The switch 64 is provided with a movable contact 68 connected to a stationary contact 70 of a timing switch 72. The switch 72 is provided with a movable contact 74 which contact is connected to the terminal 61. Thus the timing switch 72 and the bimetallic switch 64 are connected in series with each other and the heater 58, while the resistor 66 is connected in parallel with the switches 64 and 72 and in series with the the heater.

It is by virtue of the functions of the bimetallic switch 64, the timing switch 72 in their electrical cooperation and in their cooperation with the pressurizer member 28 that the percolator of this teaching is able to control the temperature of the water as the water percolates through the coffee grounds and of the period of percolation such that the percolator taught functions to consistently produce the desired brew.

The bimetallic switch is physically supported within the control unit 12 so s to be responsive to the temperature of the fluid within the pot 10. In this regard it should be mounted so as to be physically separated from the heater 58 to minimize the influence of heat generated by the heater on the bimetallic element of the switch. It may be found desirable to connect a thermal conductor between the bimetallic element and a portion of the top wall 46 of the unit 12 which portion is physically remote from the heater 58.

The timing switch 72 is shown in part in FIGS. 4–6 and is schematically represented in FIG. 7. It is a purchased unit and its construction does not constitute part of the present invention. Basically, the switch comprises a spring-loaded clock works 76 (FIG. 1) utilized to move the normally open spring contact 74 into electrical contact with the stationary contact 70 for a finite period of time dependent on the degree to which the main spring (not shown) of the clock works is stressed.

As shown in FIG. 6, a disc 78 having a notch 80 therein and an axially displaced cam 82 are mounted externally of a backplate 80 of the clockworks 76 on a shaft 85 for rotation therewith. A lever 86 is mounted for pivotal motion about a pivot point 88 and is provided with a cam follower pin 90 which pin is located within the notch 80 when the main spring of the clockworks in unwound. During operation, the pin 90 is turned out of the notch and rides on the cam surface. The lever 86 is also provided with an arm (not shown) which extends into the clockworks through a notch 92; a lever operating spring (not shown) within the clockworks attaches to the arm. A pin 94 is supported on the lever 86 and extends into a notch 96 in a switch operator 98 supported for pivotal motion about a point 100 in a switch housing 73 for the switch 72.

To operate the switch, a pointer knob 102, FIG. 4, secured to the shaft 85 is turned against the clockworks main spring causing the spring to be wound and the disc 78 and cam 82 to rotate. As the cam rotates, it causes the follower 90 to move out of the notch 80 along the cam surface, thus causing the lever 86 to be moved clockwise against the force of the lever operating spring. Movement of the lever 86 is translated into a clockwise rotation of the switch operator 98 by the pin 94 thus causing the spring contact 74 to electrically engage the stationary contact 70. The cam 82 and disc 78 are rotated clockwise at a timed rate by the clockworks and at the end of the period set by pointer 102 cause the follower to snap back into the notch 80 thereby causing the contacts 70, 74 to open.

In use, the pot 10 is filled with the desired quantity of tap water and the basket 22 is filled with the appropriate quantity of coffee grounds. The recommended practice is to use one measure of coffee grounds for each cup of coffee desired. The brewer then turns the pointer knob 102 to set the timer for the desired brewing period. As shown in FIG. 4, a dial 104 calibrated in increments of 1 minute is provided. The brewer will have to determine the brewing period desired and then turn the pointer 102 for the purpose of closing the contacts 70, 74 as described above. The brewing period will vary depending on the particle size of the coffee grounds employed; on whether or not a coffee filter is employed, and on whether a strong, average or weak brew is desired. Assuming the brewer uses the above referred to ratio of water to grounds, the brewing period will not vary in dependence on the quantity of water employed, its initial temperature and on the quantity of coffee grounds employed. In this respect, the present embodiment of the invention differs from automatic percolators presently on the market wherein the brewing period is in accordance with the last named factors.

With the timing switch closed, a circuit is completed, an electrical plug connection having been made to the terminals 60, 61, through the timing switch contacts and the normally closed contacts of the bimetallic switch to the heater coil 58 thus energizing the coil. Water in the pot is thereby heated, with that water located in the well (or for other types of percolators, in the vicinity of the base of the stem member) having a higher temperature than that portion of the water near the air-water interface. The temperature of the water in the vicinity of the base of the stem member 18 rapidly builds up to commence pumping water and steam up through the member into the pressurizer member 28 to thereby start the collection of water within the chamber 36 and the generation of a pressure head of steam within the member 28. Within approximately 1 minute of turning the percolator on, the water and steam ratios within the chamber are such that water is sprayed as pulsating jets out of the ports 38.

As water and steam are pumped up the stem member 18 they lose some heat to the fluid in the pot 10. It was found that if the temperature of the fluid in the pot is prevented from exceeding 165° F. then the temperature of the water emitted from the pressurizer is within the range 190–200° F. However, if the temperature of the water in the pot increases beyond 165° F. the temperature of the water emitted from the pressurizer rapidly exceeds the desired range and the ratio of steam to water within the pressurizer becomes such that a vapor lock occurs at the ports 38.

Accordingly, in the preferred embodiment, the bimetallic switch 64 is responsive to a temperature of 165° F. and opens when that temperature is achieved. The heater coil remains energized through the resistor 66 but at a reduced voltage. As the temperature of the water in the pot falls, the bimetal switch relaxes and closes again to thereby reapply high voltage to the heater 58. In this manner, the water temperature in the pot is kept within a range that insures the temperature of water percolating through the grounds is within the desired range. The aforementioned process continues until the timer times out to thereby cause the timing switch 72 to open and disconnect the heater 58 from the high voltage. In that the percolation temperature of the water is kept within a constant range, the timer functions to count the number of pulses of water applied to the coffee grounds and represents a device for predetermining this number. Thereafter the heater is energized through the resistor 66 to maintain the coffee in the pot at a warm temperature. Obviously this last named function could be performed by a separate warming coil connected so as to be energized when the timer times out.

SECOND EMBODIMENT OF THE CONTROL UNIT

Referring now to FIGS. 8 and 9, there is shown a second embodiment of the control unit 12. The invention according to this alternative is particularly suitable for use as a large capacity, commercial percolator. Reference numerals employed for the purpose of describing the first embodiment above are used to describe this embodiment for those elements that are similar, the only basic difference between elements having the same reference numerals is one of scale. In this embodiment of the invention, the bimetallic switch is replaced by a temperature-sensitive resistor 106 electrically connected to an amplifier relay unit 108. The resistor 106 is of a class of resistors known as thermistors; it is a device that changes resistance in response to heat. In this embodiment of the invention, a negative thermistor is employed, i.e., the thermistor resistance varies inversely with temperature, and it is suitably mounted so as to be responsive to the temperature of the heater. Accordingly, the thermistor, when connected in an electrical circuit, can function to produce an electrical signal that is a function of temperature and which signal can be employed to control the temperature or heat output of the heater 58 and accordingly, the temperature of the water in the pot 10.

The thermistor 106 is connected into the amplifier circuit 108 so as to energize a relay coil 110 to thereby open a movable magnetic spring contact 112 of a normally closed magnetically operated switch 114. When the coil 110 is energized, the contact 112 breaks from a stationary contact 116 and when the coil is deenergized, the contact 112 is returned by spring action and makes with the contact 116.

The amplifier 108 can include any of several conventional amplifier circuits and it functions basically as a switch. The thermistor should be connected in series with a variable resistance to form a voltage divider network with the junction of the thermistor and variable resistor being connected to a base electrode of a transistor operating as an input stage to the amplifier. In such a circuit the amplifier 108 is connected across the terminals 60, 61. A rectifier, e.g., a transistor diode bridge rectifier, is employed to convert the AC line current to pulsating DC and a voltage clipper such as a Zener diode may be used to regulate the peak values of the direct current.

In operation, the ratio of the thermistor's resistance to the variable resistance is set such that the potential at the junction of the two devices will cause the input transistor of the amplifier to break into conduction at the temperature that it is desired to remove the heater 58 from line voltage. If the pressurizer member 28 is not employed in the pot 10, this temperature should be in the range 190–200° F. and should not exceed 200° F. With the input transistor on, its output may be used to control intermediate stages between the input amplifier and the relay 110. For example, the input transistor can work into an amplifier stage which can, in turn, work into an output stage having the relay 110 as a load.

As the temperature of the heater falls, the resistance of the thermistor increases, thereby decreasing the current injected into the base of the input transistor and causing it to switch off. With the transistor off, the relay 110 deenergizes, causing the contacts 112 and 116 to close once again such that line voltage is reapplied to the heater 58. As in the case with the bimetallic switch, the above-noted process repeats itself until the timer times out to open the contacts 70 and 74 of the switch 72. At that time, the heater 58 is energized at a warming temperature through the resistor 66.

The second embodiment is also usable with a pressurizer member. In such a case it is only necessary to change the set point of the variable resistor and the thermistor such that the voltage at the junction of the variable resistor is of a value to turn the input transistor on when the temperature of the heater is at 165° F.

Although the foregoing description is necessarily of a detailed character, in order that the invention may be completely set forth, it is to be understood that the specific terminology employed is not intended to be restrictive or confining and that various rearrangements of parts and modificatons of detail may be resorted to without departing from the scope or spirit of the invention as herein claimed.

I claim:

1. In an electric coffeepot for extracting 18–22 percent of soluble solids from ground coffee:
   a container for holding water, said container being provided with a thermally conductive bottom wall; a hollow stem member supported by said bottom wall; a coffee grounds holding basket supported on said stem member near the upper end thereof;
   a pressurizer chamber mounted on said stem member so as to receive water therefrom and to discharge same into said basket as jets substantially at 195±5° F.;
   electric heater means for supporting said container and for transferring heat to the water in said container so as to quickly bring the temperature of the water to substantially 165° F. and for maintaining the said temperature for a presettable finite interval of time of sufficient length to extract the desirable amount of soluble solids from the coffee grounds, the heater means including
   first circuit means for supplying electrical energy to said heater means and including first switching means presettable for a predetermined period of time to open said circuit at the end of said period and second switching means responsive to the temperature of the water for opening the circuit whenever the temperature rises above 165° F.; and
   second circuit means operative upon the opening of said first switching means for substantially reducing the heat supplied to fluid in the container.

2. The coffeepot of claim 1 wherein the first switching means includes a presettable, spring operated timing device for mechanically closing a pair of normally open electric contacts in said first circuit, and wherein aid second switching means comprises a normally closed, snap action bimetallic switch connected in series with the contacts of said timing device.

3. The coffeepot of claim 1 wherein the first switching means includes a presettable, spring operated timing device for mechanically closing a pair of normally open electric contacts; and wherein said second switching means includes heat-responsive resistance means for generating an electrical signal as a function of water temperature and an electrical switch connected in series with said contacts and responsive to said signal for opening said circuit.

4. The coffeepot of claim 1 wherein the bottom wall of said container is provided with means for locking the container to said electric heater means.

UNITED STATES PATENT OFFICE
CERTIFICATE OF CORRECTION

Patent No. 3,602,129  Dated August 31, 1971

Inventor(s) Vincent W. Cherre

It is certified that error appears in the above-identified patent and that said Letters Patent are hereby corrected as shown below:

Column 1, line 43, "190° F." should read -- 195° F. --; line 47, "ta" should read -- tap --. Column 2, line 58, "8-0" should read -- 8-9 --. Column 3, line 12, cancel "the, second occurrence; lines 16 and 17, "cu-touts" should read -- cut-outs --; line 34, cancel "p"; line 58, cancel "the", second occurrence; line 68, "s" should read -- as --. Column 4, line 16, "in" should read -- is --. Column 6, claim 2, line 69, "aid" should read -- said --.

Signed and sealed this 12th day of February 1974.

(SEAL)
Attest:

EDWARD M. FLETCHER, JR.  C. MARSHALL DANN
Attesting Officer  Commissioner of Patents